United States Patent [19]

Henriksson et al.

[11] Patent Number: 5,167,381
[45] Date of Patent: Dec. 1, 1992

[54] OSCILLATING MECHANISM IN A FIXED-SPOOL FISHING REEL OF THE CLOSED-FACE TYPE

[75] Inventors: Bengt-Åke Henriksson, Svängsta; Karl L. Carlsson, Asarum, both of Sweden

[73] Assignee: Abu Garcia Produktion AB, Svangsta, Sweden

[21] Appl. No.: 787,353

[22] Filed: Nov. 4, 1991

[51] Int. Cl.⁵ ............................................. A01K 89/01
[52] U.S. Cl. ................................ 242/242; 242/158.1
[58] Field of Search ...................... 242/241, 242, 158.1

[56] References Cited

U.S. PATENT DOCUMENTS

| | | | |
|---|---|---|---|
| 3,222,010 | 12/1965 | Borgstrom et al. | 242/237 |
| 3,224,703 | 12/1965 | Clark | 242/242 |
| 3,367,597 | 2/1968 | Morritt | 242/242 |
| 3,436,033 | 4/1969 | Murvall | 242/242 |

FOREIGN PATENT DOCUMENTS 694177 9/1965 Italy ..................................... 242/242

Primary Examiner—Katherine Matecki
Attorney, Agent, or Firm—Browdy and Neimark

[57] ABSTRACT

An oscillating mechanism in a fixed-spool fishing reel of the closed-face type has a supporting plate mounted in the frame of the fishing reel. The reel has a handle whose shaft extends through the supporting plate. A first gear is nonrotatably connected to the shaft of the handle. A second gear is supported by the supporting plate and meshes with the first gear. The second gear has a smaller diameter than the first gear and carries an eccentric pin. A slide is connected to the line spool of the fishing reel for oscillating the line spool when the handle is turned. The slide has an elongate recess in which the eccentric pin engages for oscillating the slide and, hence, the line spool when the handle is turned. The slide further has a guide slot in which the shaft of the handle engages as a guide pin.

2 Claims, 3 Drawing Sheets

OSCILLATING MECHANISM IN A FIXED-SPOOL FISHING REEL OF THE CLOSED-FACE TYPE

BACKGROUND OF THE INVENTION

The present invention relates to an oscillating mechanism in a fixed-spool fishing reel of the closed-face type, having a frame in which the oscillating mechanism is disposed, a spool housing mounted on the frame, a line spool mounted in the spool housing for axial oscillation therein and connected to the oscillating mechanism to be oscillated thereby, a line-winding mechanism rotatably mounted in the spool housing and adapted, when being rotated, to wind a fishing line on the line spool, a handle mounted on the frame and having a shaft connected to said line-winding mechanism and to said oscillating mechanism and adapted, when the handle is being turned, to drive the line-winding mechanism as well as the oscillating mechanism.

In a prior-art fishing reel of this type, the line-winding mechanism consists of a line-winding cup surrounding the line spool and having two diametrically opposed pick-up pins. The line-winding cup has a shaft with a gear nonrotatably mounted thereon. A crown wheel nonrotatably connected to the shaft of the handle meshes with this gear for rotating the line-winding cup when the handle is turned. The gear ratio between the crown wheel and the gear is so selected that a suitable line-winding speed is achieved when the handle is turned at a normal rate. A suitable gear ratio is 1:4, which means that the line-winding cup will rotate four revolutions for each revolution of the handle.

In the above-mentioned prior-art fishing reel, the oscillating mechanism consists of a plate nonrotatably connected to the shaft of the handle and having an eccentric pin, and of a slide connected to the line spool and having an elongate recess in which the eccentric pin engages to oscillate the slide and, hence, the line spool when the handle is turned. In this prior-art construction, the slide performs one oscillating cycle for each revolution of the handle.

Thus, for each revolution of the handle, the line-winding cup rotates four revolutions while the line spool is caused by the slide to perform one oscillating cycle. For each revolution of the handle, the fishing line will be wound four turns on the line spool at a relatively small pitch, which is determined by the speed at which the line is moved relative to the line spool in the axial direction thereof, that is by the oscillating speed. When a thin fishing line is used, it sometimes happens that the line during the very line-winding operation wedges its way down between two turns of the line on the line spool, with a consequent risk of the line getting stuck therebetween, whereby to prevent a subsequent cast from being properly executed.

SUMMARY OF THE INVENTION

The object of the present invention is to provide an oscillating mechanism which reduces the risk of such wedging of the fishing line and which, to this end, brings about an increased oscillating speed of the line spool without appreciably increasing the space required for the oscillating mechanism in the reel frame.

According to the invention, this object is achieved by means of an oscillating mechanism, comprising a supporting plate which is mounted in the frame and through which the shaft of the handle extends, a first gear nonrotatably connected to the shaft of the handle;

a second gear supported by said supporting plate and meshing with the first gear, said second gear having a smaller diameter than the first gear and being provided with an eccentric pin; and a slide connected to the line spool and having an elongate recess in which said eccentric pin engages in order, when the handle is being turned, to oscillate the slide and, hence, the line spool, and a guide slot in which the shaft of the handle engages as a guide pin.

BRIEF DESCRIPTION OF THE DRAWINGS

The invention will now be described in more detail with reference to the accompanying drawings, in which.

DESCRIPTION OF THE PREFERRED EMBODIMENT

Figure 1:
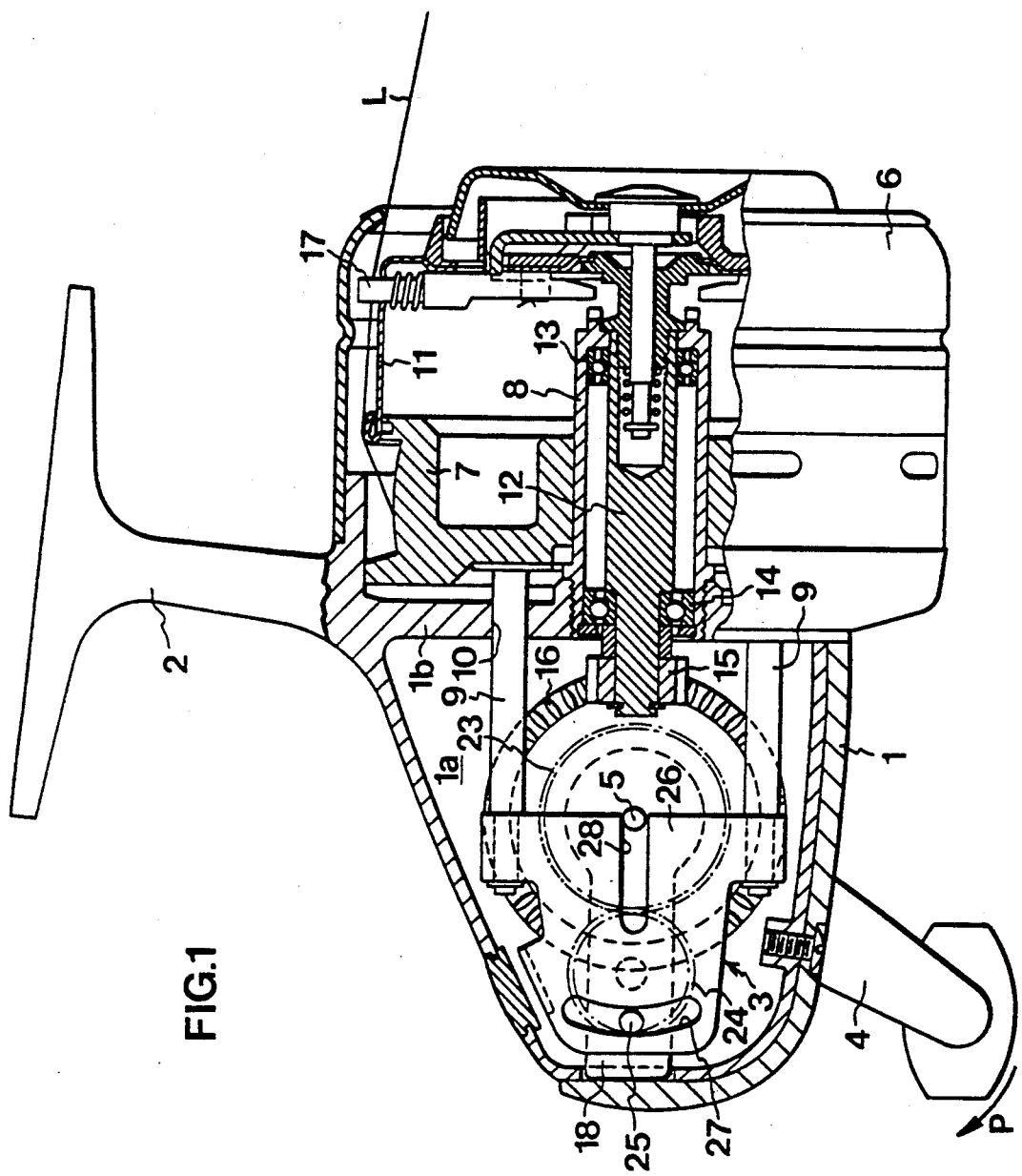
FIG. 1 is a partial longitudinal section of a fishing reel equipped with an oscillating mechanism according to the invention, illustrating the line spool of the fishing reel in a rear position.

The fishing reel illustrated in the drawings is a closed-face fixed-spool reel. The reel has a frame 1 and a foot 2 connected thereto for attaching the reel to a fishing rod. An oscillating mechanism 3 according to the invention is arranged in the frame 1. A handle 4, whose shaft 5 is arranged in one side wall 1a of the frame 1 and extends into the interior thereof, is mounted on the frame for driving the oscillating mechanism 3 when being turned.

Figure 2:
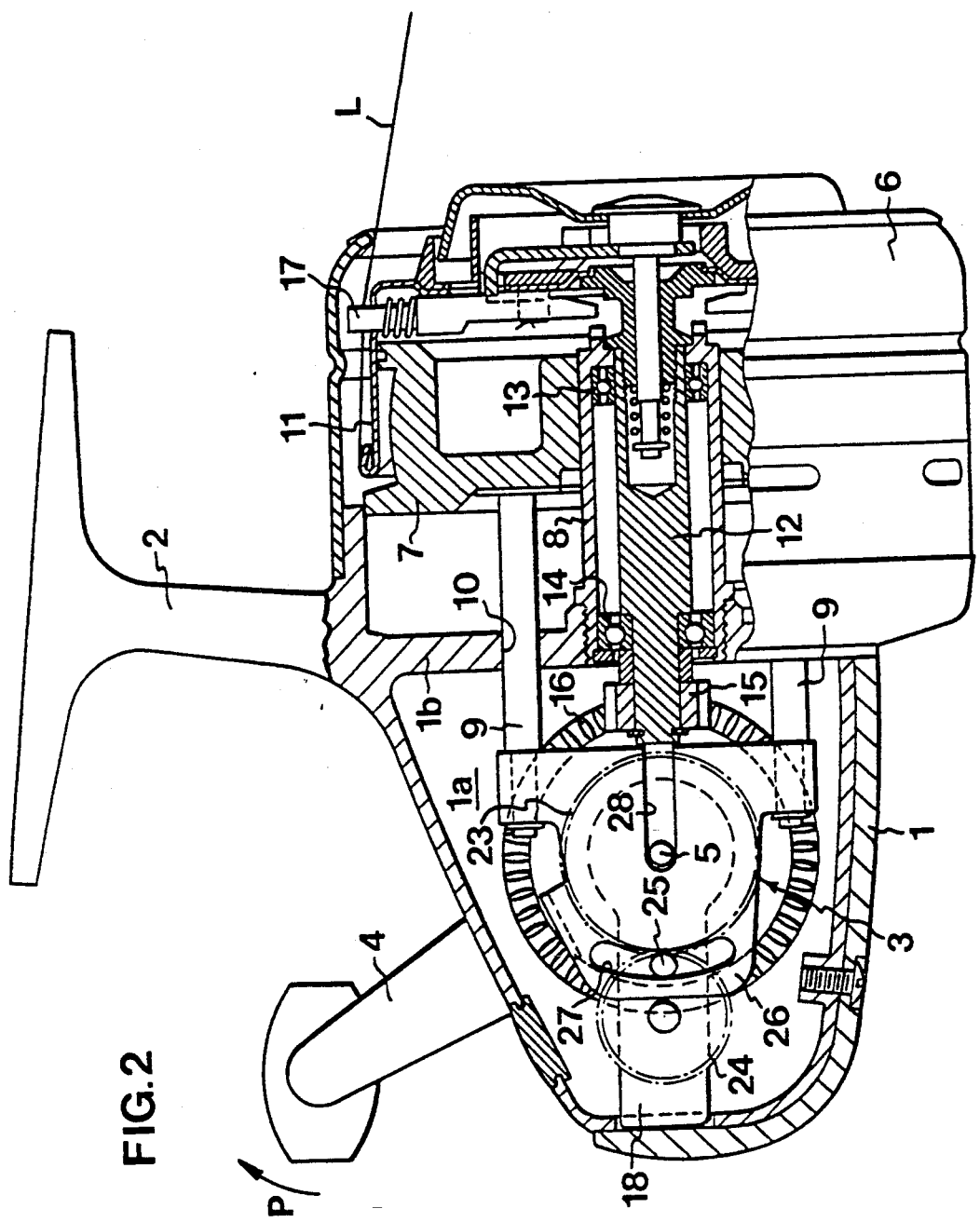
FIG. 2 corresponds to FIG. 1, but shows the line spool in a front position.
Figure 3:
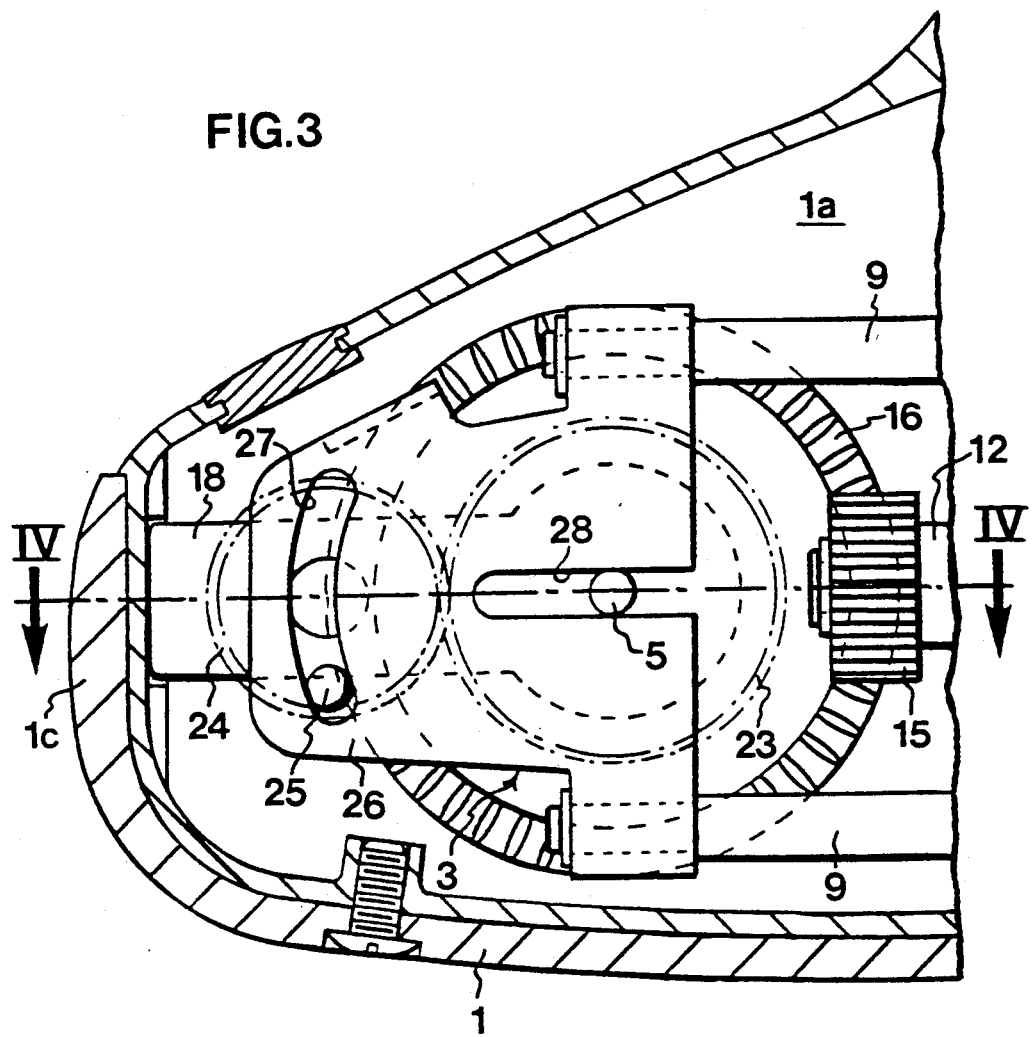
FIG. 3 is a longitudinal sectional view of the rear portion of the fishing reel, a slide connected to the line spool being shown in a position corresponding to an intermediate position of the line spool.

A spool housing 6 in the form of an outer cup is fixed to the frame 1 by means of a bayonet catch and defines, together with a front frame wall 1b, a closed space accommodating a line spool 7. The line spool 7 is axially displaceably mounted on a hollow spindle 8 connected to the frame 1 and extending into the spool housing 6 from the front frame wall 1b. The line spool 7 is connected to the oscillating mechanism 3 by means of two connecting rods 9 extending through holes 10 provided therefor in the front frame wall 1b. By means of the oscillating mechanism 3, the line spool 7 is movable back and forth, as will be described in more detail hereinafter, between a rear position (FIG. 1) and a front position (FIG. 2).

A line-winding mechanism 11 in the form of an inner cup is rotatably mounted in the spool housing 6 in front of the line spool 7. The line-winding cup 11 has a center shaft 12 rotatably mounted in the hollow spindle 8 in bearings 13 and 14 and extending some distance into the frame 1. At its end located in the frame 1, the shaft 12 has a gear 15 nonrotatably mounted on the shaft end and meshing with a crown wheel 16 nonrotatably connected to the shaft 5 of the handle 4.

When turning the handle 4 in the direction indicated by an arrow P, the line-winding cup 11 is rotated for winding a fishing line L on the line spool 7. The gear ratio between the crown wheel 16 and the gear 15 suitably is 1:4, as mentioned by way of introduction, which means that the line-winding cup 11 executes four revolutions for each revolution of the handle 4.

Two diametrically opposed, radially directed pick-up pins 17 are arranged in the line-winding cup 11. The pins 17 are radially shiftable between a radially inner position, to which they are moved when a cast is to be made, and a radially outer position (FIGS. 1 and 2), in which they project outside the cup 11 and to which they are automatically moved as soon as the rotation of the handle 4 in the direction of line retrieve P commences. During the rotation of the handle 4 in the direction P, one of the pick-up pins 17 engages the line L and winds it on the line spool 7 while this is oscillated by the oscillating mechanism 3.

The mechanism by means of which the pick-up pins 17 are shifted between their two positions being no part of the present invention, it will not be described in more detail here. The mechanism concerned is thoroughly described in copending U.S. Pat. application Ser. No. 787,348 entitled "Line-winding mechanism in a fixed-spool fishing reel of the closed-face type" filed on the same day as the present patent application. A similar mechanism is also described in U.S. Pat. No. 3,222,010.

Figure 4:
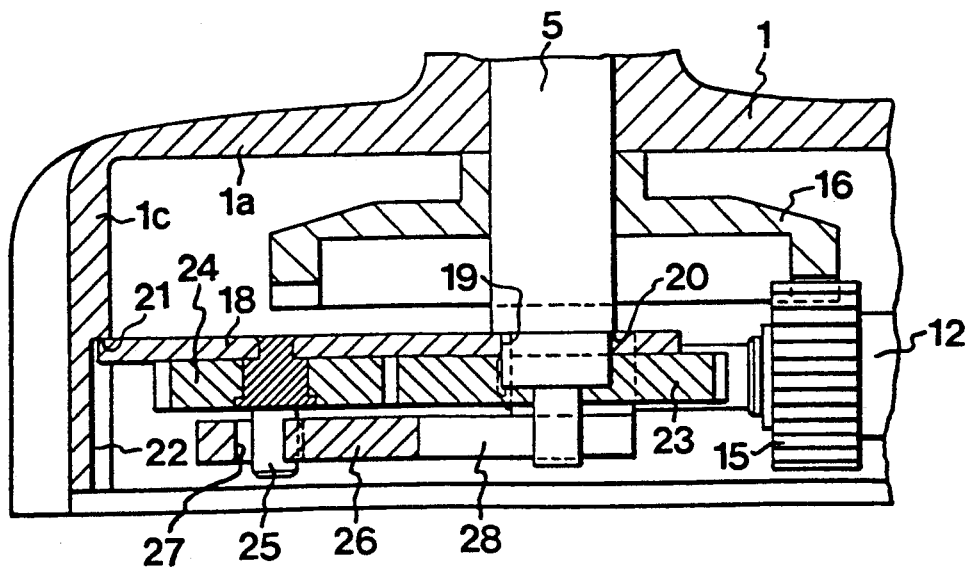
FIG. 4 is a sectional view taken along the line IV—IV in FIG. 3.

The shaft 5 of the handle 4 has an outer portion, an intermediate portion having a smaller diameter than the outer portion, and an inner portion having a smaller diameter than the intermediate portion (see FIG. 4). A supporting plate 18 included in the oscillating mechanism 3 is formed at one end with a through hole 19 having the same diameter as the intermediate portion of the shaft 5. This portion of the shaft 5 extends through the hole 19, the supporting plate 18 bearing on the shoulder 20 formed between the outer portion of the shaft 5 and its intermediate portion. The plate 18 abuts at its other end on a shoulder 21 formed in the rear wall 1c of the frame 1 and defining the bottom of a groove 22 in the rear frame wall 1c.

A gear 23 is nonrotatably connected to the shaft 5 in the intermediate and inner portions thereof. The supporting plate 18 carries a gear 24 having a smaller diameter than the gear 23 and meshing therewith. The gear 24 has an eccentric pin 25. A slide 26, which is connected to the line spool 7 by means of the connecting rods 9, has an elongate recess 27 in which the eccentric pin 25 engages to oscillate the slide 26 when the handle 4 is turned, and a guide slot 28 in which the inner portion of the shaft 5 engages as a guide pin for the slide 26.

Since the gear 24 has a smaller diameter than the gear 23 nonrotatably connected to the shaft 5 of the handle 4, it will rotate more than one revolution when the handle 4 is turned one revolution. In a preferred embodiment, the gears 23 and 24 are suitably so dimensioned that the gear 23 rotates about 1.6 revolutions for each revolution of the handle 4. This entails that the slide 26 and, thus, the line spool 7 will perform about 1.6 oscillating cycles for each revolution of the handle 4. In this way, the line L is so placed on the line spool 7 as to reduce the risk, mentioned in the introduction to this specification, of the line wedging its way down between two turns of the line wound on the line spool. By replacing the gears 23 and 24 with other gears, whose total radii suitably equal the total radii of the gears 23 and 24, so as to maintain one and the same distance between the axes of the gears and, hence, permit the use of a similar supporting plate 18, it is possible to obtain gear ratios other than 1:1.6. However, the gear ratio should be chosen different from 1:n, where n is an arbitrary integer. The risk that the line may wedge its way down between two turns of the line on the line spool 7 can be further reduced by shifting the slide 26 and, thus, the line spool 7 at a speed which during one and the same oscillating cycle varies other than purely sinusoidally, as is the case when the recess of the slide 26 is straight. In the illustrated embodiment, such a suitable speed variation is achieved by making the recess 27 of the slide 26 arcuate instead of straight. In the illustrated example, the center of the arc of the recess 27 is situated on the geometrical axis of the shaft 5.

What we claim and desire to secure by Letters Patent is:

1. Oscillating mechanism in a fixed-spool fishing reel of the closed-face type, having a frame in which the oscillating mechanism is disposed, a spool housing mounted on the frame, a line spool mounted in the spool housing for axial oscillation therein and connected to the oscillating mechanism to be oscillated thereby, a line-winding mechanism rotatably mounted in the spool housing and adapted, when being rotated, to wind a fishing line on the line spool, a handle mounted on the frame and having a shaft connected to said line-winding mechanism and to said oscillating mechanism and adapted, when the handle is being turned, to drive the line-winding mechanism as well as the oscillating mechanism, comprising a supporting plate which is mounted in the frame and through which the shaft of the handle extends,
   a first gear nonrotatably connected to the shaft of the handle;
   a second gear supported by said supporting plate and meshing with the first gear, said second gear having a smaller diameter than the first gear and being provided with an eccentric pin; and
   a slide connected to the line spool and having an elongate recess in which said eccentric pin engages in order, when the handle is being turned, to oscillate the slide and, hence, the line spool, and a guide slot, in which the shaft of the handle engages as a guide pin.

2. Oscillating mechanism as claimed in claim 1, wherein the elongate recess is arcuate.

* * * * *